R. F. DOWNEY.
CARD VENDING MACHINE.
APPLICATION FILED APR. 10, 1909.

959,482.

Patented May 31, 1910.
3 SHEETS—SHEET 1.

UNITED STATES PATENT OFFICE.

RICHARD F. DOWNEY, OF MILWAUKEE, WISCONSIN, ASSIGNOR TO AUTOMATIC CARD SELLER COMPANY, OF MILWAUKEE, WISCONSIN, A CORPORATION OF WISCONSIN.

CARD-VENDING MACHINE.

959,482.  Specification of Letters Patent.  Patented May 31, 1910.

Application filed April 10, 1909. Serial No. 489,037.

*To all whom it may concern:*

Be it known that I, RICHARD F. DOWNEY, a citizen of the United States, and resident of Milwaukee, in the county of Milwaukee and State of Wisconsin, have invented certain new and useful Improvements in Card-Vending Machines; and I do hereby declare that the following is a full, clear, and exact description thereof.

The object of my invention is to provide simple, economical, and effective vending machines for postal-cards or the like, the mechanism being preferably coin-controlled, the invention consisting in certain peculiarities of construction and combination of parts as hereinafter fully set forth with reference to the accompanying drawings and subsequently claimed.

Figure 1:
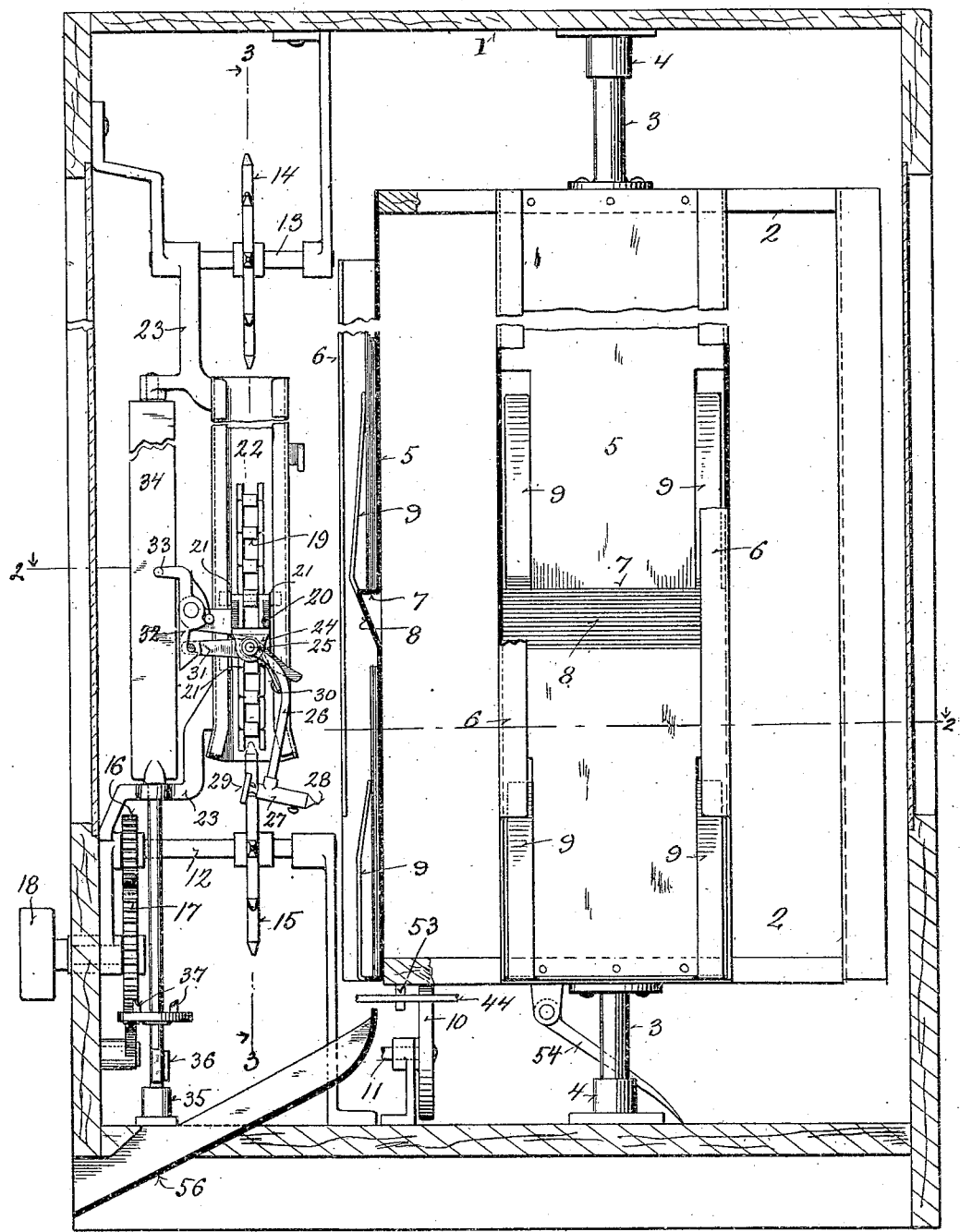
Figure 2:
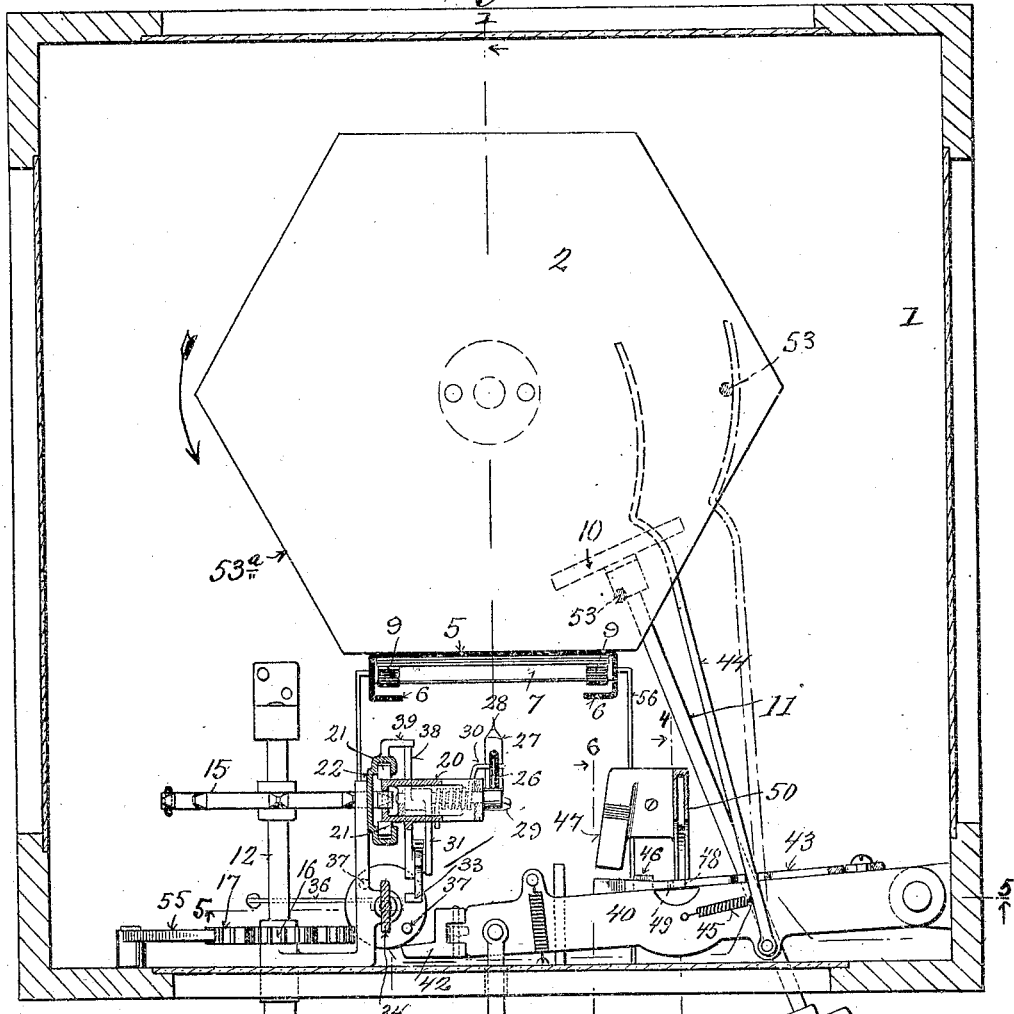
Figure 3:
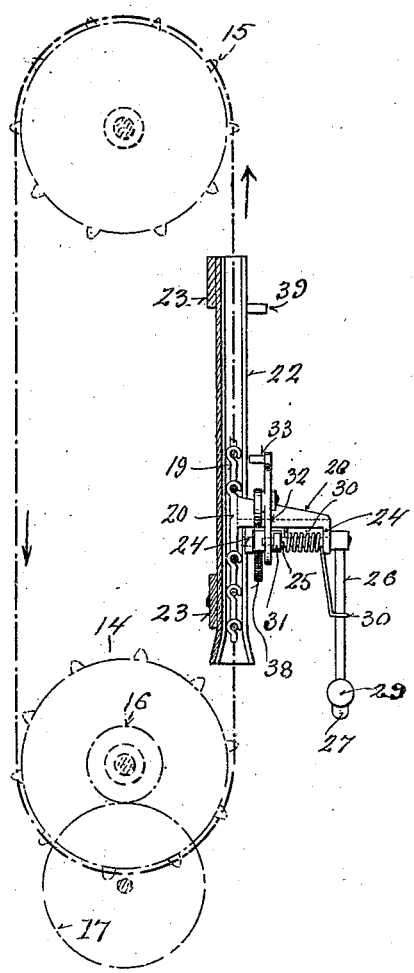

In the drawings: Figure 1, represents a side elevation of a machine embodying the features of my invention, partly in section as indicated by line 1—1 of Fig. 2, and with other parts broken away to better show the details of construction; Fig. 2, is a plan sectional view of the same, the section being indicated by line 2—2 of Fig. 1, with certain parts removed and other parts broken away for clearness of illustration; Fig. 3, is a detail sectional view on line 3—3 of Fig. 1, illustrating conveyer sprockets and certain driving-gear in dotted lines; Fig. 4, is a detail sectional view of the coin-mechanism, as indicated by line 4—4 of Fig. 2; Fig. 5, is a detail sectional view of the coin-mechanism, as indicated by line 5—5 of Fig. 2; and Fig. 6, a detail cross-section of the same, as indicated by line 6—6 in Fig. 2.

Referring by numerals to the drawings, 1 indicates a housing or case provided with panels of glass on four sides for the purpose of viewing series of cards, which cards are carried by a rotatory display reel 2, as shown in Figs. 1 and 2. The reel consists of upper and lower heads provided with studs 3, which studs 3 have bearings in boxes 4 secured to the top and bottom of the casing. The reel-heads are connected by series of longitudinal metallic plates 5, having inturned flanged edges 6, which flanges serve as delivery-guides for post-cards. The back of each metallic plate is upset at regular intervals throughout its length by horizontal shelves 7, which shelves in conjunction with the flanges 6 constitute pockets for stacks of cards arranged to rest therein. The extended edges of the shelves are connected to the back of the plate 5, by means of an inclined face-portion 8 forming a spacer between each of the pockets. The groups of cards are held in their respective pockets by means of spring-fingers 9 that extend from the angle-faced portion 8, their free ends being adapted to rest upon the exposed card of the stack, terminating approximately midway of the length of the pocket.

As shown in Fig. 2, only one of the metallic plates are illustrated as being connected to the heads, but it is understood that each of the polygon faces of said head is provided with a similar plate. The lower reel-head is engaged by a friction driving-disk 10 carried by a spindle 11 that is mounted in suitable bearings carried by the housing. The spindle extends through the housing and is provided with a knob, by means of which the disk is rotated by the operator, whereby the reel may be revolved in order that any one of the plates carrying the cards may be brought toward the front of the machine, at which point they are extracted by means of mechanism to be hereinafter described. Mounted within the housing at the front thereof and in suitable bearings, is a shaft 12, there being a corresponding shaft 13 alined therewith and hung in bearings secured to the upper portion of said housing, which latter shaft carries an idle-sprocket 14, while the lower shaft 12 carries a driven sprocket 15, and a pinion 16 that is engaged by a gear-wheel 17 fixed on a spindle which projects through the front of the housing and carries a knob 18, whereby motion is imparted to the aforesaid gearing by the operator. Mounted upon the sprocket-wheels 14 and 15 is an endless conveyer-chain 19, one link of which chain, as shown, consists of a bracket 20, carrying anti-friction rollers 21. These rollers are provided for the purpose of engaging a track-section 22, through which one stretch of the chain passes, whereby the bracket 20 is guided and held rigid during the period of its travel through the track-section.

While I have shown the conveyer-chain as being provided with one bracket only, in practice, two or more of these brackets are carried by said chain. The track-section is rigidly supported by means of arms 23 extending from the housing, the lower end or mouth of said track-section being flared so as to facilitate the entrance therein of the conveyer-chain at this point. Mounted in ears 24 of the bracket 20 is an arbor 25, to the outer end of which is secured an arm 26 that carries a head 27, into which is fitted a needle-point 28, the forward end of the head 27 being provided with an arbitrarily colored indicator-button 29. A coil-spring 30 surrounds the arbor 25, one end of which spring is confined by the bracket 20 and the opposite end is arranged to engage the arm 26, whereby the same is rocked in order that its needle 28 may be brought into engagement with a card selected by the operator to be delivered thereto. Secured to the opposite end of the arbor is a locking-arm 31, a stud of which arm is engaged by the nose of a spring-controlled latch 32. The latch is fulcrumed to the bracket 20, and has a tail-extension 33 that projects in the path of rotation of a vertically disposed tripper-bar 34. The tripper-bar is mounted in bearings carried by the arms 23, its lower end being also stepped into a thimble 35, that is secured to the housing bottom. Just above this thimble, the tripper-finger is flattened for the reception of the end of a leaf-spring 36, adapted to engage the same, the tripper-finger being also provided with a disk at this point having oppositely disposed pins 37 projecting therefrom. Extending from the arbor 25 in the opposite direction from the locking-arm 31 is a resetting-arm 38, which arm is arranged to be engaged by a resetting-lug 39, that extends from the track-section 22, one of these resetting-lugs being provided for each pocket in the vertically disposed plates 5 in such relation thereto that the needle 28 is disengaged from a card as its bottom edge is drawn from under the springs 9, the needle (and connected mechanism) constituting a selector, whereby a card may be abstracted from any pocket of its particular row, the selector being capable of longitudinal movement paralleling that row of pockets opposite the same.

A spring-controlled rocker 40 is fulcrumed to a bracket carried by the housing, from which rocker a push-button 41 extends through a slot in said housing to the exterior, whereby the rocker is manipulated in opposition to its spring. Hinged to the end of the rocker is a gravity-controlled pawl 42, which pawl is arranged to engage one of the two pins 37 carried by the tripper-bar disk, whereby said disk and bar is positively rotated for a portion of a revolution with each movement of the rocker. The movement imparted to the tripper-arm by the rocker is approximately in excess of a quarter of a revolution, but owing to the flattened portion thereof being engaged by the spring 36, this movement is sufficient to place such flattened portion in a position relative to the spring, that pressure of the latter will cause the tripper-finger to make a half revolution, at which time the said spring 36 will again seat upon the said flattened portion of the tripper-bar and hold the same in the position, as shown in Fig. 2, the gravity-pawl 42 in the meantime having ridden over the pin 37, which is now in position to be engaged. A vertically disposed tumbler 43 is pivotally secured to the rocker arm, being slotted at its pivotal point to permit slight lateral play. The lateral play of the tumbler is controlled by a lever 44, which lever is engaged by lugs projecting from the tumbler, the lever being fulcrumed to the rocker 40 and normally held in the position shown in Fig. 2, by means of a coil-spring 45. The forward end of the tumbler is supported by a projection 46, that forms part of the rocker, the said end being normally arranged to engage a stop-block 47 secured to the bottom of the housing. The bottom edge of the tumbler is provided with a pair of arbitrarily arranged slots 48, 49, the former of which is normally alined with a coin-runway 50. The coin-runway projects through a slot in the housing and bridges over the rocker 40 terminating with a lower pocket 51, which is alined with the slot 48 of the tumbler, the rear portion of the pocket 51 being provided with a shoulder 52, which is arranged to oppose the rear edge of a coin therein. For example, in this instance, the top edge of the slot 48 is so arranged with relation to the bottom of the pocket 51, that a penny resting therein will extend slightly into the slot, but cannot escape therethrough nor could a coin of larger diameter, such as a nickel, escape. Should the tumbler however be moved so as to bring its slot 49 into alinement with the coin-pocket 51, a small coin or penny would pass freely therethrough, but a larger coin would be lodged therein similarly as described with relation to the first slot 48. By this arrangement of tumbler in connection with the coin-runway, I am enabled, if desired, to alternate the several rows of pockets with cards of different prices, which prices will be indicated in any suitable manner at the top of each row or in some instances the rows of one price can be grouped together.

With the above object in view, as best illustrated in Fig. 2, the lower head of the reel is provided with pins 53, one of which is shown in its correct relative position with relation to that face of the reel-head 53ª, which, for example, we will assume is designed to carry pockets containing cards, the price of which are five cents each. Lever 44 extends in the path of travel of the pin 53 and is slightly in advance thereof. Should the reel be revolved in the direction, as indicated by the arrow, in order to bring the face 53ª in position, whereby a card may be selected therefrom, said pin 53 will engage lever 44 and move the same to the position indicated by dotted lines. The movement of the lever thus accomplished has in the meantime brought slot 49 of the tumbler or movable member into register with the coin-pocket 51, and in order to actuate the card-picking mechanism a coin, the size of a five cent piece, must be inserted into the coin-slot. Should a smaller coin, as for instance, a penny, be placed therein, it would simply pass through the slot without performing any function. The correct coin being in position, the operator can now press the push-button 41. The initial movement of the rocker 40 causes the tumbler 43 to ride over the coin, which is checked by the shoulder 52, and this slight rise of the tumbler is sufficient to cause its free end to assume a position clear of the stop-block 47, whereby the rocker is permitted to make its full movement and thereby actuate the tripping-bar 34 to cause release of the card-picker mechanism, the operation of which will be hereinafter described.

Should the operator attempt to actuate the rocker without first inserting a coin into the machine, it is apparent that the tumbler would engage the stop-block 47 and lock the mechanism prior to any operation of the tripping-device. Owing to the curved end-extension of the lever 44, after a quick movement of said lever, the pin will hold the mechanism in its changed position until such time that the next row of pockets upon the reel is brought into approximately and alined position relative to the selective mechanism, nor is it possible to manipulate the mechanism with a penny when cards of higher value are only partly in position, owing to the quick throw of lever 44, the full movement being accomplished while the rear edge of one face of the reel is passing the picker-point to the front edge of the incoming face of said reel. The card-reel, as shown in Fig. 1, is held against backward movement by means of a drag-dog 54, which is carried by the bottom reel-head and arranged to engage the housing-bottom, it being obvious that the reel can be turned for inspection of the cards prior to a coin delivery.

The conveyer is rotatable in one direction only, as indicated by the arrow in Fig. 3, this movement being also independent of coin-control, and while free to turn in one direction, a reverse movement is checked by a dog 55, which engages the gear-wheel 17 that is manually operated.

When the row of cards containing that one which the operator desires to purchase has been brought to an approximate line facing the picker-head button, the operator revolves the conveyer until the button has reached a point approximately in the center of the card he desires, a coin being then inserted, the next step is to press push-button 41, causing a half revolution of the tripper-bar, which bar engages the tail of latch 32 and thereby permits the spring 30 to act, due to disengagement of the locking arm 31, whereby the needle of the picker-mechanism is thrown into engagement with the face of the card. The operator then actuates the conveyer through knob 18 and the selector-mechanism will draw the card free of the spring-fingers 9, the needle in the meantime having traveled up the inclined face 8 of the plate carrying with it the card, the resetting arm 38 is now engaged by the resetting-lug 39, and as the conveyer continues to travel, this lug disengages the selector-mechanism from the card allowing the same to drop, by gravity, through the channel between the spring-fingers 9 and inturned flanges 6 of the plate, the card being received into an inclined chute 56 disposed under the row of pockets, from which chute it is delivered through a slot in the housing to the operator.

Engagement of the resetting lug and arm 38 causes arm 31 to assume its locked position with relation to catch 32, as shown in Fig. 1, and the parts are now in their normal position ready for the next operation. To insure locking engagement between the latch 32 and arm 31, it is desirable to have a slight surplus movement of said arm above the nose of the latch, and although this necessitates a slight movement of the arm 31 incidental to engagement of the resetting members when the selector - mechanism passes the same, there will be no change of position other than a slight vibration of arm 31.

As previously stated, it is desirable to have more than one selector-mechanism, so that one of the several is always within a short distance below the desired pocket of cards, whereby a slight movement of the conveyer is necessary.

It is understood that after each coin has performed its function with relation to the tumbler, it is dropped from the coin-pocket 51, by gravity, into a suitable receptacle, and while I have shown and described the selector as having a short steel point of a length that cannot wholly pierce a card, it is obvious that in some instances a friction-surface such as a button of rubber or analogous material may be utilized as a substitute therefor, the essential features of the invention being an inclosed visible reel provided with card pockets and a conveyer provided with a selector having coin-controlled releasing mechanism in connection therewith, whereby any exposed card upon the face of the reel may be selected and delivered to the purchaser, the directions for manipulating the machine being so simple that persons with ordinary intelligence can readily operate the device, the directions being as follows: Revolve the red knob until the line of cards containing the one which you desire is facing you; revolve the black knob until the red button upon the selector is positioned centrally of the card desired; drop the coin covering the price of the card in the slot and press the button; now revolve the black knob and the card will be delivered, these directions it being understood are drawn having in mind to make the knob 18 black and the knob upon spindle 11 red.

I claim:

1. A vending machine comprising a housed revoluble reel, lineal series of vertically disposed rows of pockets carried by the reel, delivery guide flanges common to the pockets of each row, a yielding card retaining and stripping finger for each card pocket, selector mechanism disposed adjacent to the reel whereby access is had to each pocket of a particular row, means for actuating the selector mechanism, and a lock and release mechanism in connection with the selector actuating means.

2. A vending machine comprising a housing having a revoluble reel mounted therein, lineal series of vertically disposed rows of pockets carried by the reel, uninterrupted delivery guide flanges extending from the sides of the pockets of each row, and yielding card retaining and stripper finger for each pocket, a selector in juxtaposition to the face of said reel, means exterior of the housing for imparting longitudinal movement to the selector relative to the particular row of reel pockets, a spring-controlled selector actuating mechanism, and lock and release means for the actuating mechanism.

3. A card vending machine comprising a housing having a revoluble reel mounted therein, card pockets carried by the reel, a vertically disposed conveyer arranged to have movement longitudinally of the reel, a spring-actuated card-selector carried by the conveyer, fixed means for locking the spring-actuated card-selector disposed at intervals adjacent to the path of travel of said card-selector, a releasing-bar for the aforesaid card-selector locking means, the bar being arranged parallel with the travel of said card-selector.

4. A card vending machine comprising a vertically disposed reel having rows of longitudinally disposed card-pockets therein, a closed housing for the reel, a longitudinally movable card-selector mechanism disposed adjacent to the reel, means exterior of the housing for imparting longitudinal movement to the selector mechanism, other means exterior of the housing for imparting rotation to the reel, spring-controlled actuating means for the selector mechanism, a locking-latch for the spring-controlled selector actuating means, a releasing-bar arranged to actuate the locking-latch, whereby the selector mechanism is released, and a series of resetting lugs disposed in the path of said selector-mechanism, whereby the latter is reset after each releasing operation.

5. A card vending machine comprising a housing having a revoluble reel mounted therein, lineal series of vertically disposed rows of pockets carried by the reel, delivery guide flanges common to the pockets of each row, a yielding card retainer and stripper finger for each pocket, a vertically disposed endless conveyer arranged to have movement longitudinally of the reel, a spring actuating card selector carried by the conveyer, fixed means for locking the spring actuating card selector disposed at intervals adjacent to the path of travel of said card selector, and a releasing bar for the aforesaid card selector locking means, the bar being arranged parallel with the travel of said card selector.

6. In a machine of the character described, a vertically disposed series of alined pockets having uninterrupted delivery guide flanges constituting side walls of the pockets, horizontally disposed cross shelves upon which cards are adapted to rest, and a yielding card retainer and stripper finger for each pocket adapted to extend above the cross shelve portion.

In testimony that I claim the foregoing I have hereunto set my hand at Milwaukee, in the county of Milwaukee, and State of Wisconsin, in the presence of two witnesses.

RICHARD F. DOWNEY.

Witnesses:
GEO. W. YOUNG,
GEORGE G. FELBER.